United States Patent [19]

Bartram

[11] 3,889,266
[45] June 10, 1975

[54] MULTIPLE CORRELATION METHOD AND APPARATUS FOR MEASURING AND SUMMING TIME DIFFERENCES

[75] Inventor: James F. Bartram, Darien, Conn.

[73] Assignee: The Dewey Electronics Corporation, Paramus, N.J.

[22] Filed: Jan. 22, 1959

[21] Appl. No.: 788,463

[52] U.S. Cl............ 343/112 R; 235/181; 343/12 R; 343/102; 343/112 D
[51] Int. Cl............................................. G01s 11/00
[58] Field of Search...................... 343/113; 235/181

[56] References Cited
UNITED STATES PATENTS

| | | | |
|---|---|---|---|
| 2,676,206 | 4/1954 | Bennett | 343/100.7 |
| 2,854,191 | 9/1958 | Raisbeck | 343/100.7 |
| 2,866,899 | 12/1958 | Busignies | 343/100.7 |

Primary Examiner—T. H. Tubbesing
Assistant Examiner—Richard E. Berger
Attorney, Agent, or Firm—Richard L. Stevens

[57] ABSTRACT

15. Apparatus for determining the distance between a radio transmitting system and a radio receiving system, said receiving system including five receiving stations, one of said stations being situated at the center of a circle and the remaining four being equally spaced around the periphery of said circle whereby the signals are received with different time delays, means for determining a linear combination of said time delays, means responsive to said last means for indicating said distance, and means responsive to the measured linear combination of said delay times for producing a video pulse having a time delay corresponding to said distance.

16 Claims, 5 Drawing Figures

Fig. 1.

MULTIPLE CORRELATION METHOD AND APPARATUS FOR MEASURING AND SUMMING TIME DIFFERENCES

The present invention relates to a method and means for measuring and summing the time differences between a plurality of signals by a multiple correlation technique.

An object of the present invention is to obtain information from a plurality of similar signals by deriving a linear combination of the time differences between said signals.

Another object of the invention is to obtain a linear combination of the time differences between a plurality of like signals, and to measure the value of said linear combinations using only conventional circuits such as current or voltage multipliers, filters and delay lines.

Another object of the invention is to produce a linear combination of the time differences of a plurality of similar signals by adding the time differences of a first set of said signals by multiplying together the frequency components of said first set of signals and selecting the sum frequencies resulting from the multiplications, and adding the time differences of a second set of said signals by multiplying the frequency components of the second set of signals together and selecting the sum frequencies resulting from said second multiplications, delaying the products of the first-mentioned and second-mentioned signals relative to each other by various amounts and then multiplying them together and obtaining the substantially zero frequency components of the last multiplication as a function of the time delay.

Still another object of the invention is to determine the range or location of a radiating source or receiving station by obtaining and measuring a linear combination of the time differences of a plurality of received signals.

According to the invention, a prescribed combination of the time differences of a plurality of signals is obtained and measured by deriving from each signal a plurality of like frequency components and multiplying together the same frequency components of a first set of said signals whose time differences are to be added together, and similarly multiplying together, frequency by frequency, the frequency components of a second set of said signals to add time differences of the second set of signals. After introducing relative time delays between the first and second sets of signals, the two sets of signals are mixed or multiplied together and a resultant frequency which may be a substantially zero frequency component thereof is selected and measured to subtract the time differences of one set of signals from the time differences of the other set of signals. In correspondence with the time delay producing the maximum output a synthetic video signal may be produced. This synthetic signal may then be used in the same manner, for example, as a gated radar echo and the time delay corresponding to this video signal will be a measure of the range of the radar target.

The above and other objects and advantages of the invention will become apparent from the following description and the drawings in which:

FIG. 3 is a block diagram of another application of my invention;

It will be evident to those skilled in the art that the present invention has a wide range of applications and may be useful, for example, in passive detection and ranging, navigation, radio astronomy, and various types of instrumentation. The invention will, therefore, be explained by first giving an exposition of the principles thereof and then a description of a few illustrative embodiments.

Assume that a signal arrives at all inputs of the system, in general, with different strengths and times of arrival, but with no difference in waveform. By repeated multiplication and filtering, a linear combination of the times of arrival can be generated. This will be demonstrated analytically.

The signal, which can be any function of time, can be represented by the Fourier integral:

$$f(t) = 1/2\pi \int_{-\infty}^{+\infty} g(\omega) e^{i\omega t} d\omega. \qquad (1)$$

where
$f(t)$ = the signal, as a real function of time $t$,
and
$g(\omega)$ = the spectrum of the signal, a complex function of radian frequency $\omega$.

A more useful form for this exposition is found by expressing the complex spectrum $g(\omega)$ in polar form:

$$g(\omega) = A(\omega) e^{i\alpha(\omega)} \qquad (2)$$

where
$A(\omega)$ = the magnitude of the spectrum
$\alpha(\omega)$ = the phase of the spectrum.

It is shown in standard textbooks that for $f(t)$ real, which a physical signal must be, that $A(\omega)$ is an even function of frequency, while $\alpha(\omega)$ is an odd function of frequency.

Making use of the above facts, the Fourier integral can be expressed in the following useful form:

$$f(t) = 1/\pi \int_0^\infty A(\omega) \cos[\omega t - \alpha(\omega)] d\omega. \qquad (3)$$

The above form is simply interpreted: The signal, which is any real function of time, can be represented as a sum of cosines.

In the above, a delay is easily represented by simply subtracting the amount of the delay $\tau$ from the independent variable $t$:

$$f(t-\tau) = 2 \int_0^\infty A(\omega) \cos[\omega(t-\tau) - \alpha(\omega)] d\omega \qquad (4)$$

It can now be shown that cosines have a useful property, which forms the basis of the invention. Suppose two signals with the same waveforms to be given, one delayed $\tau_1$, and the other $\tau_2$. Suppose also that their strengths are unequal, being $k_1$ and $k_2$ respectively:

$$k_1 f(t-\tau_1) = 2k_1 \int_0^\infty A(\omega) \cos[\omega(t-\tau_1)-\alpha(\omega)] d\omega \quad (5)$$

$$k_2 f(t-\tau_2) = 2k_2 \int_0^\infty A(\omega) \cos[\omega(t-\tau_2)-\alpha(\omega)] d\omega$$

If now these are multiplied frequency-by-frequency (in practice, this requires narrow band filters), the result for each frequency $\omega$, is as follows:

$$2k_1 A(\omega) \cos[\omega(t-\tau_1)-\alpha(\omega)] \, 2k_2 A(\omega) \cos[\omega(t-\tau_2) -\alpha(\omega)] = 2k_1 k_2 A^2(\omega) \{\cos\omega(\tau_1-\tau_2) + \cos[2\omega t - \omega(\tau_1+\tau_2) - 2\alpha(\omega)]\} \quad (6)$$

The important property of cosines can now be stated: the product of two cosines whose arguments contain delay times is a sum of two cosines, one of which is at zero frequency and contains in its argument the difference in delay times, the other of which is at double frequency and contains in its argument the sum of delay times. This is independent of relative strengths or the form of the spectrum magnitude function.

By filtering, if the two cosines in the result are at different frequencies, the difference and the sum can be separated. The cosine containing the sum in its argument is still in the form of a general time function, hence can be used to create further sums and differences. On the other hand, the cosine containing the difference in its arguments is merely a direct current value, hence is suitable only as a terminating stage. It will be shown later how the information can be extracted from it.

With the two basic operations, addition and subtraction, available, linear combinations of delay times can be provided to suit particular applications.

Because only the sum can be propagated, while it will be shown that information is extractable only from the difference cosine, the linear combinations possible are limited to those typified by the following example:

$$\tau_1 + \tau_2 - \tau_3 + \tau_4 - \tau_5 - \tau_6,$$

where the coefficients are all unity and the number of positive terms is equal to the number of negative terms.

The reason for this is that the above is found by $$(\tau_1 + \tau_2 + \tau_4) - (\tau_3 + \tau_5 + \tau_6),$$

a difference between two sums where each sum has the same number of terms. The sums are found first by iterated use of the sum cosine, separated out by high pass filtering. The difference is found last, and the information extracted by the process described below.

The general expression for a linear combination of the above type is $$\sum_{n=1}^{N} S_n \tau_n, \quad (7)$$

where $$S_n = \pm 1,$$

and $$\sum_{n=1}^{N} S_n = 0.$$

Obviously, N must be an even number for the latter condition to be possible.

The method of extracting information from the difference cosine can now be described. In general, a delay is deliberately introduced in one of the two incoming signals, and that value of delay that results in a peak in the direct current difference cosine is a measure of the desired time difference.

Suppose the two input signals are, as given in equation (5); where now $\tau_1$ and $\tau_2$ might be sums of time delays developed in preceding stages. Now, delaying the second signal by an amount $\tau$, $$k_2 f(t-\tau_2-\tau) = 2k_2 \int_0^\infty A(\omega) \cos[\omega(t-\tau_2-\tau)-\alpha(\omega)] \quad (8)$$

In this particular operation, where the difference cosine above is the desired result, it happens not to be necessary to multiply frequency-by-frequency. The same result can be achieved with greater economy with one narrow band low pass filter at the output, as will be seen.

The product is $$2k_1 k_2 \int_0^\infty \int_0^\infty A(\omega_1) A(\omega_2) \cdot$$

$$\cos\{(\omega_1-\omega_2)t - [\omega_1 \tau_1 - \omega_2(\tau_2+\tau)] - [\alpha(\omega_1) - \alpha(\omega_2)]\} d\omega_1 d\omega_2$$

$$+ 2k_1 k_2 \int_0^\infty \int_0^\infty A(\omega_1) A(\omega_2) \cdot \quad (9)$$

$$\cos\{(\omega_1+\omega_2)t - [\omega_1 \tau_1 + \omega_2(\tau_2+\tau)] - [\alpha(\omega_1) + \alpha(\omega_2)]\} d\omega_1 d\omega_2$$

By the use of a narrow band low pass filter (or long time constant integrator), the terms whose frequency is zero are selected. These correspond to those for which $\omega_1 = \omega_2$, which is exactly the desired result:

$$2k_1 k_2 \Delta\omega \int_0^\infty A^2(\omega) \cos\omega(\tau_1-\tau_2-\tau) d\omega \quad (10)$$

where $\Delta\omega =$ the radian frequency bandwidth of the filter.

The above integral becomes $$2k_1 k_2 \Delta\omega R(\tau_1-\tau_2-\tau), \quad (11)$$

where R is commonly called the autocorrelation function, and is the transform of $A^2(\omega)$, which in turn is the spectral density of the input signals. The exact form of R depends upon the form of $A(\omega)$, but it is shown in standard textbooks to be an even function and to have its maximum when its argument is zero. This occurs when $$\tau = \tau_1 - \tau_2,$$

which is precisely what was wanted.

Figure 1:
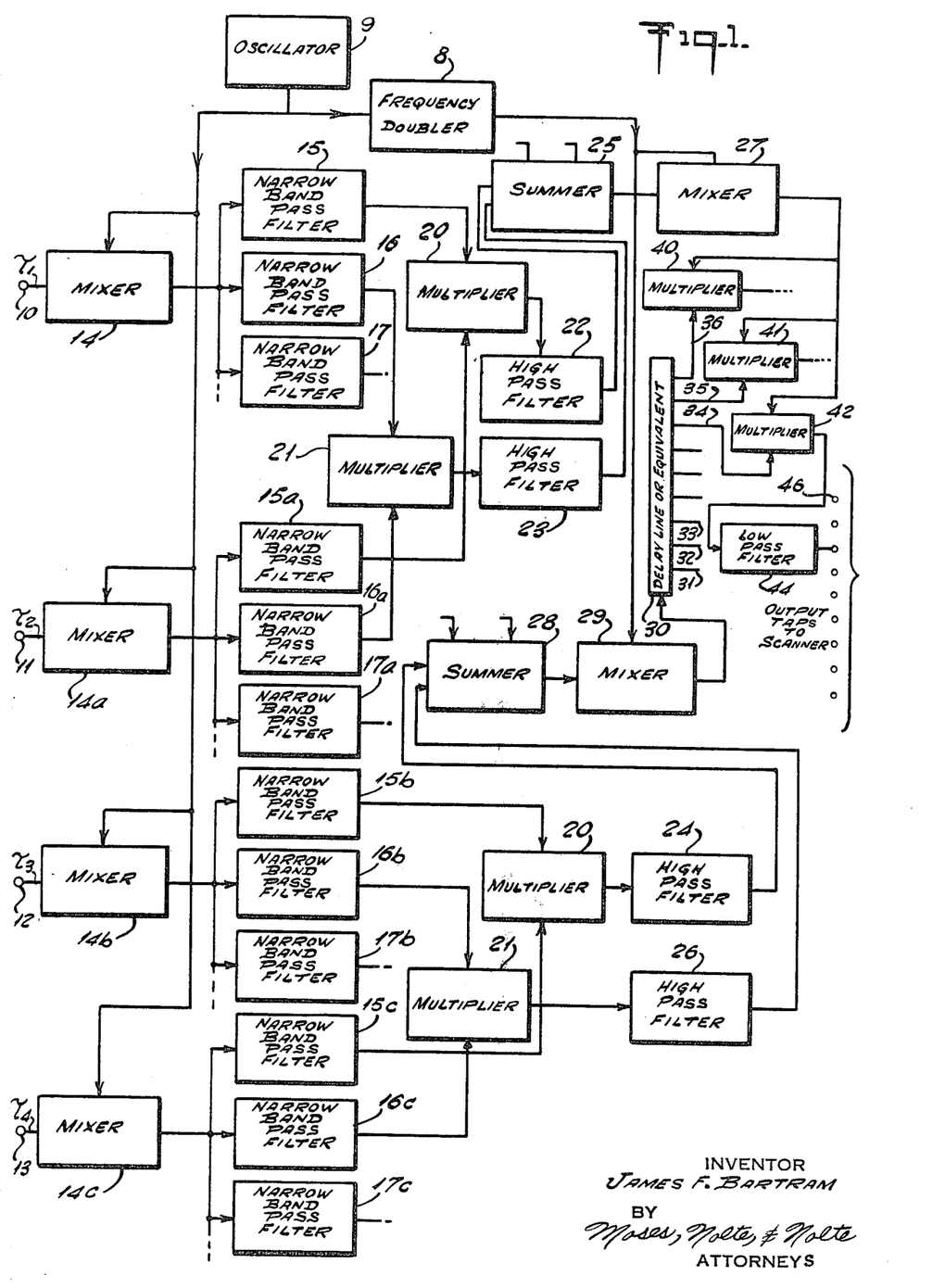
FIG. 1 is a block diagram of one embodiment of my invention.

Referring to FIG. 1 there is shown a circuit arrangement using multipliers, filters and delay lines to create a linear combination of the type defined in Equations 7. It is assumed that the desired combination is $$\tau_1 + \tau_2 - \tau_3 - \tau_4$$

A plurality of electrical signals are received or arrive at input terminals 10, 11, 12 and 13. These input signals might be in the form of continuous waves having random noise thereon with a band width of some 10 megacycles per second. The signals have delay or time differences $\tau_1$, $\tau_2$, $\tau_3$, and $\tau_4$. To prevent overlapping of the sum and difference frequency components in the later stages of the system, the above-described signals are preferably modulated on a carrier which may have a frequency of, say, 30 mc. per sec., which carrier wave frequency may be produced by mixers 14, 14a, 14b, 14c connected to an oscillator 9. Inputs 10, 11, 12 and 13 may be at receiving stations spaced several miles apart. The signals from the mixers are fed through a plurality of narrow band pass filters 15, 16, 17, 15a, 16a, 17a, etc. which have a center frequency near 30 mc. and a bandwidth of about 10 kilocycles per sec. The number of filters 15-17 etc. in each channel may be very large, of the order of 100, for example. Like frequencies from filters 15 and 15a are supplied to a multiplier 20. Similarly, signal components of the same frequency are supplied by filters 16 and 16a to a multiplier 21. The outputs of other filters 17, 17a, etc. likewise are multiplied together. The multipliers may be mixer circuits or circuits containing semi-conductor devices making use of their non-linear properties. The band width of the multipliers is required to be quite wide, for example, 40 megacycles per sec. so that if transistors are used they must be of the high speed type capable of handling high frequencies. The outputs of multipliers 20 and 21 are fed through high pass filters 22 and 23 to a summing circuit 25 which combines the outputs of all the high pass filters. The signals arriving at inputs 12 and 13 pass through similar narrow band pass filters 15b, 16b and 17b and 15c, 16c, 17c, etc. to multiplying circuits 20 and 21 etc., each of which combine the same frequency component of signals $\tau_3$ and $\tau_4$. The outputs of the multipliers then pass through the high pass filters 24, 26 etc. High pass filters 22-26 are tuned to select the frequency which is double the frequency of the signals selected by filters 15, 16, etc., respectively. The outputs of high pass filters 24 and 26 and all other filters of this type which are not shown in the drawing are connected to the summing circuit 28. The summers may take the form of summing operational amplifiers well known in the field of analogue computations. Because of the large number of inputs to the summers (of the order of 100) which may used, each summer may consist of more than one stage. For example, two stages can be used, with ten inputs per summing amplifier of the ten amplifiers forming the first stage, and with the outputs of these ten stages connected to the input of the second stage summing amplifier.

The outputs of summers 25 and 28 are preferably translated back down in frequency by an amount equal to twice the carrier frequency referred to above. This is accomplished by using a frequency doubler 8 connected to oscillator 9 to double the aforesaid carrier frequency, and mixers 27 and 29 to perform the frequency translations. The thus translated signal from summer 28 is then fed to a delay line 30, having a plurality of output taps 31-36. The delay line must have a broad frequency band and a sufficient length, for example, at least a fraction of a microsecond. The line preferably has a large number of taps along its length, the number of taps being of the order, say, of one hundred. Various methods of constructing such delay lines are known in the prior art. For example, the delay line may consist of a large number of series connected precisely cut pieces of coaxial cable, one for each value of the delay desired.

The outputs of the delay lines and the outputs of the summer 25 are fed to mixing circuits or multipliers 40, 41, 42. The output of each mixer or multiplier 40-42 is connected through a low pass filter 44 to one of the output taps 46. The low pass filters 44 may have pass bands of some 50 cycles per second, or what is equivalent, integration times of about 3 milliseconds. It is found that the shape of the pass band characteristic of filters 44 is not critical, and simple resistance-capacitance integrating networks are adequate. Any suitable means may be provided for measuring or scanning the outputs at the taps 46. It will be understood that the magnitude of the outputs at various taps 46 will be different and will have a peak value at a particular tap.

It will be evident that in FIG. 1 the delay times $\tau_1$ and $\tau_2$ were added together and delay times $\tau_3$ and $\tau_4$ were added together. The delay times are added together by combining the two signals of $\tau_1$ and $\tau_2$, for example, frequency by frequency in a plurality of multipliers 20, 21. From each multiplier the high frequency filters 22 and 23 select the frequency component having double the frequency of the signals fed to the multipliers 20, 21. The signals in all the high pass filters are then collected by the summing circuit 25. The same process was also performed on the signals having time differences $\tau_3$ and $\tau_4$ and after the latter signals are collected by the summing circuit 28, they pass through the delay line 30. The output of each tap of the delay line is combined in a multiplier circuit 40-42 with the outputs of the summing circuit 25. Low pass filters 44 select the zero frequency or difference frequency terms and integrate the same. The outputs of filters 44 are, therefore, of the form given by expression 10 and 11. The outputs have a maximum at that tap 46 derived from the delay line tap 31-36 having a delay $t$ given by the expression $t = \tau_1 + \tau_2 - \tau_3 - \tau_4$. The delay time $t$ which yields the maximum output at tap 46 is a measure of the linear combination of the time differences of the four input signals. The effect of low pass filters 44 is to create voltages at tap 46 that are virtually constant during the time of examination of a particular input signal.

The value of the voltage on any one output tap 46 is of little significance by itself. However, if the distribution of all the tap voltages is observed, a pattern is seen in which the value of the time delay at which a pulse shape is located is the desired linear combination of the different times of arrival of the signals under observation.

If the input signals at terminals 10-13 are radar signals, a desirable way of presenting the information contained in the distribution of the tap voltages is to create a synthetic radar video signal which can be used in the same manner as a real radar video pulse. This can be done by sampling taps 46 sequentially. One method of accomplishing such synthetic sampling will be explained in connection with FIGS. 4 and 5.

Figure 2:
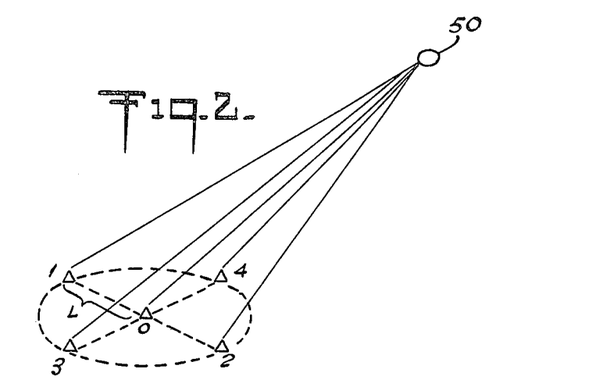
FIG. 2 is a schematic diagram indicating the manner in which the range of a radio station or target may be determined by a linear combination of the time differences of the signals.

FIG. 2 schematically shows an arrangement of radiating and receiving stations in connection with which the multiple correlation method of measuring and summing time differences can be used for passive detection and ranging. Five receiving stations are placed on a plane, one station 0 being in the center and the other four stations 1, 2, 3, and 4 being symmetrically placed on the periphery of a circle about the center. The five stations may all receive energy from the same source 50, and it will be shown that the distance to the source can be determined from the relative times of arrival of the energy at the various receiving stations. It is quite evident that the five stations 0–4 may be transmitters radiating five separable signals to station 50; and the same relation of range to time delays would obtain.

It can readily be shown that the range or distance is given to a good approximation by the following:

$$r = \frac{L^2}{c\tau} \quad (13)$$

where
$r$ = the range, or distance, from the source to the center station,
$L$ = the length of the base line, or radius of station emplacement,
$c$ = the speed of light
$\tau$ = a linear combination of times of arrival, given below.

With this arrangement of the stations, the quantity $\tau$ is given by the following equivalent forms:

$$\tau = (\tau_1 - \tau_0) + (\tau_2 - \tau_0) + (\tau_3 - \tau_0) + (\tau_4 - \tau_0)$$

$$\tau = (\tau_1 + \tau_2 + \tau_3 + \tau_4) - 4\tau_0$$

$$\tau/4 = \overline{\tau}_i - \tau_0$$

$$(14)$$

where $\overline{\tau}_i$ is the average time of arrival at the outlying stations 1–4.

It can be recognized that the above forms of Equation 14 are suitable for multiple correlation, being comprehended in Equation (7).

The quantities defined in Equations (14) can be determined by the arrangement shown in FIG. 3. The signals received by the receiving stations arrive on lines 51–55. From each of these lines the signals are fed to a large number of narrow band pass filters 56–60 which are similar to the corresponding narrow band pass filters in FIG. 1 through mixers 51a–55a connected to an oscillator 66. The like frequency components selected by filters 56, 57 are fed to a current or voltage multiplier 61 and the like frequency components selected by filters 58, 59 are supplied to multiplier circuit 62. From the outputs of these multipliers high pass filters 63 and 64 select the cosine terms having double frequency components (see Equation 6). The selected components from high pass filters 64 and 63 are then combined in the multiplier circuit 65 and again the sum frequency or double frequency output of multiplier 65 is selected by high pass filter 67. There are, of course, a great number of other channels each similar to the channel consisting of elements 56–59 and 61–67 each operating on a different frequency component of the signals arriving at terminals 51–54. The outputs from the large number of filters 67 are collected in summers 68 similar to those of FIG. 1.

The output of summer 68 may be translated back down in frequency by amount equal to four times the frequency of oscillator 66. For this purpose oscillator 66 is connected to a frequency quadrupler 66a, which supplies a mixer 69 connected to the output of summer 68.

The signals from the receiving station 0 arriving on line 55 may pass through a plurality of narrow band pass filters 60, each adapted to select a narrow band of frequencies of the received signals. The output of each band pass filter 60 is impressed on a square law device 70, such as a diode circuit, which is followed by a high pass filter 71. Filter 71 selects a component having a frequency equal to twice the frequency of the component selected by filter 60. The selected double frequency term will in effect have a delay time equal to $2\tau_0$. The selected component from high pass filter 71 is then passed through a second square law device 73 and a second high pass filter 75 which selects the double frequency of the output of filter 71. There are, of course, a large number of channels 60, 70–75 all connected to a summer 76. The output of summer 76 may be translated downward in frequency by a mixer 77 connected to frequency quadrupler 66a and then fed to a delay line 78 of the same type as that shown and described in FIG. 1. The outputs from the various taps of delay line 78 are combined in mixer or multiplier circuits 80, 81 and 82 with the outputs of summing circuits 68. Outputs from the multipliers 80–82 of substantially zero frequency are selected by low pass filters 84, 85 and impressed on the taps 86. The voltages on taps 86 will have a distribution showing a maximum at some particular tap for which the delay time $t$ of delay line 78 equals $(\tau_1 + \tau_2 + \tau_3 + \tau_4) - 4\tau_0$. The voltages on taps 86 may be scanned as described in greater detail herebelow.

In FIG. 2 stations 0–4 need not be on the ground. Each station may be on a ship; the ships keeping station in such a manner that the configuration is proper: the outlying ships being ninety degrees apart on a circle with known radius about the center ship. Also, the source of radiation may be in the air, on the ground, in the sea, or beneath the ground. Location of a source of seismic shocks is possible, for example.

A navigational system can be built by simply turning the passive detection system around, as mentioned above. Referring to FIG. 2, the five fixed stations can be caused to transmit rather than receive, the transmission providing identical information but in five separate channels by the use of such standard methods as frequency or time multiplexing. The point in space previously operating as a source of radiation becomes a receiver instead. The receiver might be on any aircraft, ship, or land vehicle that wishes to know its own location. By separating the five channels, and feeding the signals in the inputs of an arrangement like that in FIG. 3, the distance from the center station 0 can be found. The bearing can be found by conventional directional antenna methods.

It is standard practice to measure distance to astronomical bodies by the difference in time of arrival technique. The multiple correlation described in conjunction with the five station configuration will be advantageous, because the computation is automatic.

Figure 4:
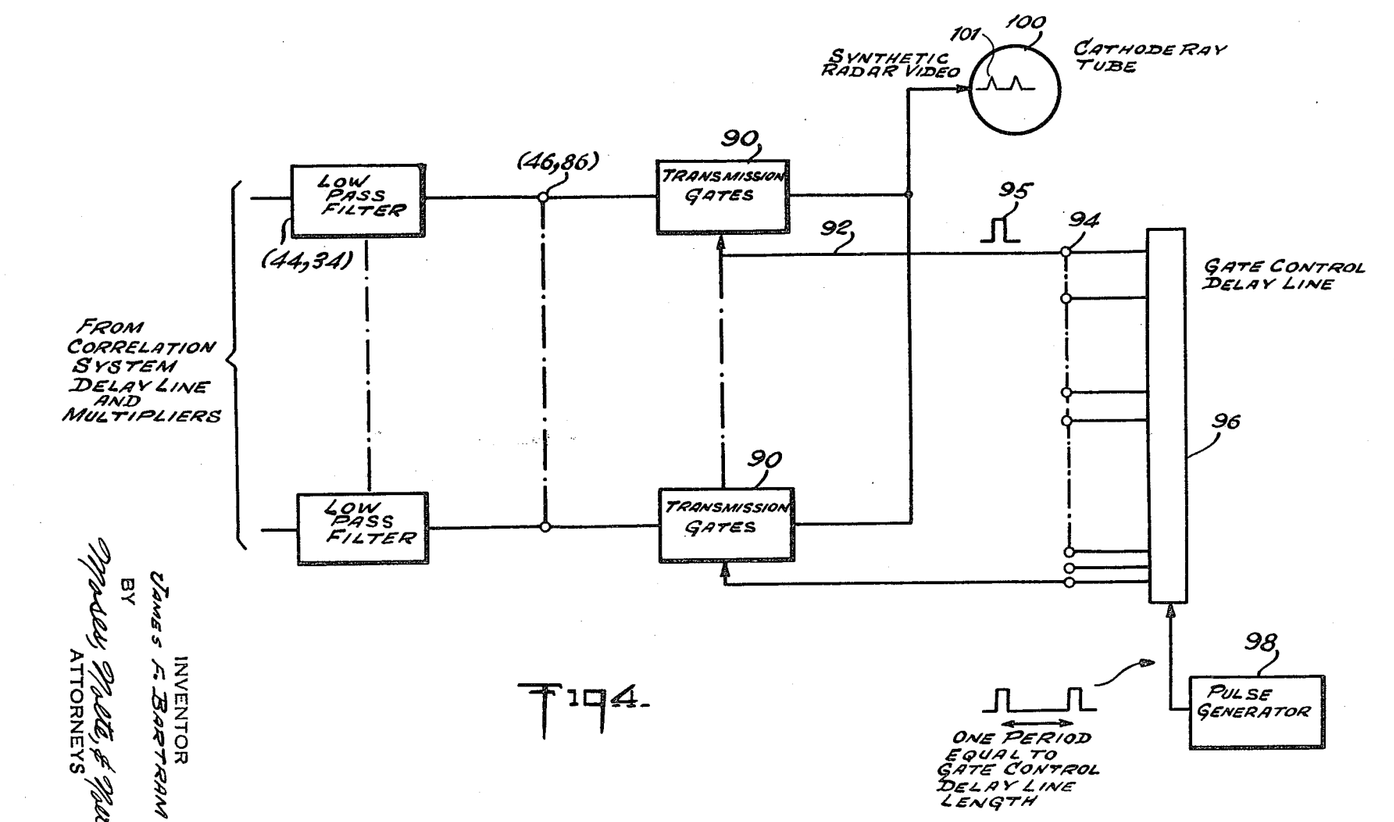
FIG. 4 is a schematic diagram of apparatus for scanning the outputs of the apparatus shown in FIG. 1 and producing a synthetic video signal.
Figure 5:
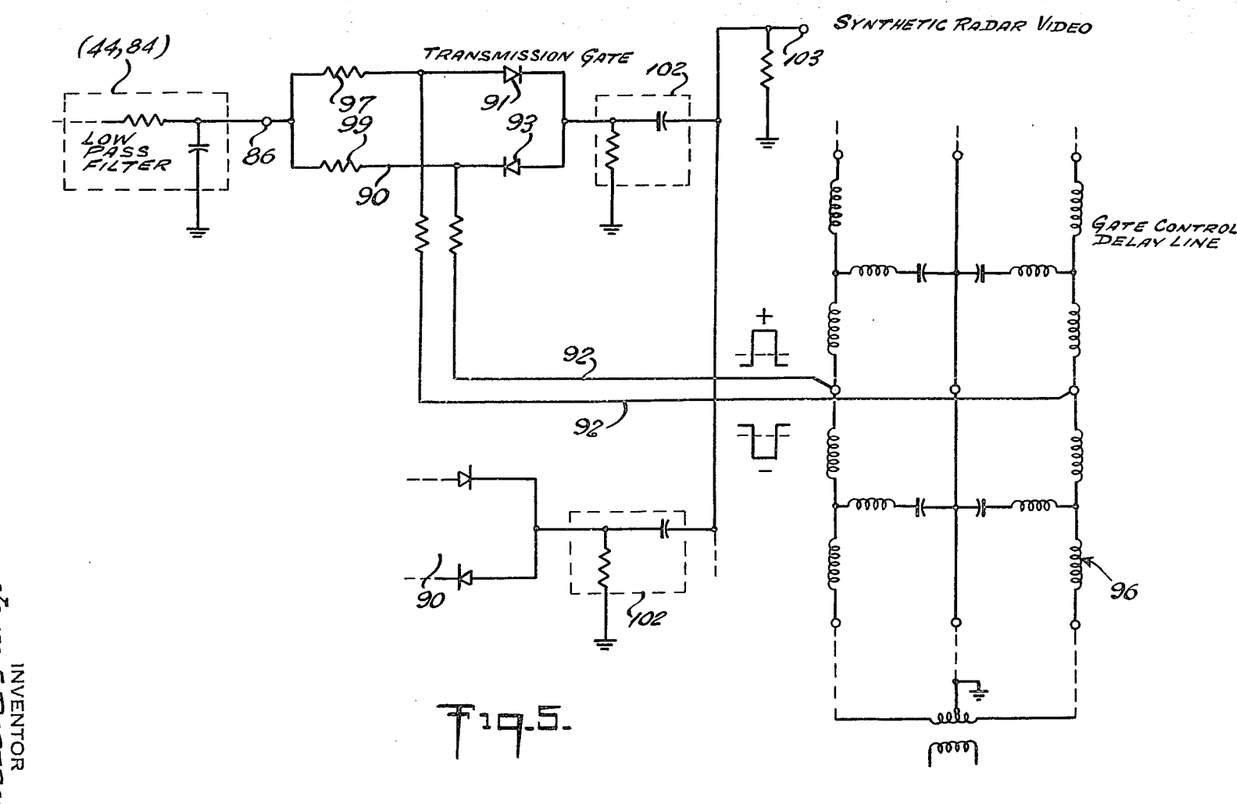
FIG. 5 is a schematic diagram of the gating circuits and delay lines used in FIG. 4.

Referring to FIGS. 4 and 5, there is shown schematically apparatus for sampling the voltage distribution on the taps 46 or 86 of FIGS. 1 and 3. The voltages on the output taps are fed to transmission gates 90 connected through control lead 92 to taps 94 on a delay line 96. The delay line is fed by a pulse generator 98 connected to one end thereof. If the voltage on taps 86 is derived from a system such as shown on FIG. 2 in which the delay time $t$ is inversely proportional to range, it is necessary to perform the sequential sampling of the taps 86 according to an inverse law. For this purpose, the taps 94 will be arranged along delay line 96 in such an inverse relationship. In other words, each tap 94 will have a delay inversely related to the delay of the tap on delay line 78 of FIG. 3 with which it is associated. The taps 94 will thus provide a sequence of pulses 95 which will sequentially open transmission gates 90 and thus cause a sequential sampling of the voltage on the output taps 46 or 86. The output of the transmission gates may be fed to any suitable indicator 100 such as a cathode ray tube. Pulse generator 98 feeds into delay line 96 pulses of a length simulating radar pulses. (Say 1, 2 or 3 microseconds), with an interpulse interval equal to the length of the delay line, which may be, for example, 3 milliseconds. The taps 94 on the line are arranged, as explained above, in a non-uniform manner with a spacing which may vary, say, from about 10 to 40 microseconds, so that the rate of closure of transmission gates 90 varies according to the desired inverse law expressed by Equation 13. For each sampling of the transmission gates a synethetic radar video pulse will appear on the cathode ray tube as indicated at 101.

As shown in FIG. 5, the delay line may be a balanced, lumped-constant line. The transmission gate 90 may consist of a pair of diodes 91, 93 connected to resistors 97 and 99 which are in turn connected to the output taps 46 or 86. Control leads 92 feed positive and negative pulses from the delay line to gate circuits 90. These pulses open diodes 91 and 93 and permit a pulse to travel through the transmission gates, and filters 102 to the synethetic radar video output connection 103 to the cathode ray tube 100.

It will be evident that the techniques herein described are applicable to many kinds of instrumentation measurement and control. In any application where it is desired to obtain the mean value of any analogue quantity (voltage, current, temperature, pressure etc.) taken simultaneously at a number of locations in a process, the values of the quantity can be converted into values of time delay of a locally generated signal through the use of a linear sweep, and the multiple correlation system used to compute the sum of these delays. Since these delays are time differences, their sum is a member of the allowable linear combination class described by Equation (7).

The embodiments of the invention herein disclosed are to be considered as illustrative, for it is apparent that many modifications, variations and applications of the invention may be made without departing from the principles thereof. The invention, therefore, is not to be construed as limited, but is defined by the following claims.

I claim:

1. A method of measuring the time differences of a plurality of electrical signals comprising the steps of deriving frequency components of two of said signals, multiplying each frequency component of one of said signals by a frequency component of the other of said two signals, selecting from each product of the multiplied components a component having a frequency equal to the sum of their frequencies, subjecting a third signal to a time delay, multiplying said delayed third signal with said sum frequency components, selecting the substantially zero frequency components of said last multiplication, and measuring said substantially zero frequency component for different amounts of said time delay.

2. A method according to claim 1, wherein said third signal is subjected to a plurality of time delays and each different time delayed portion of the third signal is separately multiplied with said sum frequency components simultaneously, and a zero frequency voltage is derived from each of the separate multiplications.

3. A method of measuring the time differences of a plurality of electrical signals comprising the steps of deriving like frequency components of two of said signals, multiplying each frequency component of one of said two signals by the like frequency component of the other of said two signals, selecting from each product of the multiplied components the double frequency component, summing the selected double frequency components, subjecting a third signal to a time delay, multiplying said delayed third signal with said summed double frequency components, selecting the substantially zero frequency components of said last multiplication, and measuring said substantially zero frequency component for different amounts of said time delay.

4. A method of measuring the time differences of a plurality of signals comprising the steps of deriving like frequency components of a number of said signals, multiplying each frequency component of one of said signals by the like frequency component of another of said signals, selecting from each product of the multiplied components the sum frequency component, multiplying the sum frequency components together and again selecting the sum frequency resulting from the multiplication, summing the last selected frequency components, similarly multiplying the remainder of said plurality of signals and similarly selecting the products of the multiplications, subjecting last-mentioned multiplied signals to a time delay, multiplying said delayed signals with said summed frequency components, selecting the substantially zero frequency components of said last multiplication, and measuring said substantially zero frequency component for different amounts of said time delay.

5. The method of measuring a linear combination of the delay times of a plurality of electrical signals having equal component frequencies, comprising the steps of multiplying together $m$ signals whose delay times have one algebraic sign in said linear combination, selecting the set of multiplication products having frequencies equal to $m$ times the component frequencies of said $m$ signals, multiplying another signal by itself and selecting the set of multiplication products having frequencies equal to $m$ times component frequencies of said other signal, subjecting the two sets of products to a relative time delay, multiplying together the two sets of products, selecting the substantially zero frequency components of said last multiplication, and measuring said substantially zero frequency components for different amounts of said time delay.

6. The method of measuring time differences $\tau_n$ of a plurality of electrical signals to obtain a linear combination $$\sum_{n=1}^{N} S_n \tau_n,$$

where
$$S_n = \pm 1,$$
and
$$\sum_{n=1}^{N} S_n = 0,$$

comprising the steps of multiplying together the $m$ signals for which $S_n = +1$, selecting the set of multiplication products having frequencies equal to $m$ times the component frequencies of said $m$ signals, multiplying together the remaining $N-m$ signals, selecting the set of multiplication products of the $N-m$ signals having frequencies equal to $N-m$ times the component frequencies thereof, subjecting the two sets of products to a relative time delay, multiplying together the two sets of products, selecting substantially zero frequency components of said last multiplication, and measuring said substantially zero frequency components for different amounts of said time delay.

7. The method of measuring a plurality of electrical signals to obtain a linear combination of their time differences $\tau_n$ defined by $$\sum_{n=1}^{N} S_n \tau_n,$$

where
$$S_n = \pm 1,$$
and
$$\sum_{n=1}^{N} S_n = 0,$$

comprising the steps of selecting the frequency components of the signals, multiplying together each frequency component of the m signals for which $S_n = +1$, selecting the multiplication products having frequencies equal to m times the component frequencies of said m signals, multiplying together each frequency component of the remaining $N-m$ signals, selecting the multiplication products of the $N-m$ signals having frequencies equal to $N-m$ times the component frequencies thereof, subjecting one of the two sets of products to a plurality of different relative time delays, multiplying each of the different delayed sets of products simultaneously and separately by the undelayed set of products, selecting the substantially zero frequency components of said last multiplications and producing a plurality of voltages corresponding to said different amounts of said time delay.

8. The method according to claim 5 for determining the position of a radio transmitting station, comprising the additional steps of deriving from the transmitted signals at at least three spaced receiving stations, said plurality of electrical signals having time differences $\tau_n$.

9. The method according to claim 8, wherein the step of receiving said signals comprises receiving five signals at five receiving stations one of which is at the center of a circle and the other four are equally spaced on the periphery of the circle.

10. The method according to claim 8 comprising the step of sequentially sensing said plurality of voltages and producing a signal in response to said plurality of voltages having a time delay corresponding to the distance range of said transmitting station.

11. Apparatus for obtaining a linear combination of the time delays of a plurality of continuous wave signals comprising a plurality of input terminals on each of which one of said signals is adapted to be impressed, a plurality of narrow band pass filters having different frequency bands connected to each of said terminals, a plurality of first multiplier circuits each connected to at least one of said filters, a high pass filter connected to the output of each of said multiplier circuits for selecting and passing the sum frequency of the multiplier circuits, a first summing circuit connected to the high pass filters which are connected to selected ones of said terminals, a second summing circuit connected to the high pass filters which are connected to other selected input terminals, a delay line having a plurality of outlet taps at different delay points therealong, means for impressing the output of the second summing circuit on the input of said delay line, a multiplying circuit connected to each of the taps, means connecting the first summing circuit to each of said last-mentioned multiplying circuits, a low pass filter connected to the output of each of said last-mentioned multiplying circuits and an output tap on each of said low pass filter circuits.

12. Apparatus according to claim 11, wherein each of said first multipliers has connections to a pair of input terminals through a pair of said narrow band pass filters.

13. Apparatus according to claim 11 including means for sensing the voltages of said output taps.

14. Apparatus according to claim 13 wherein said last-named means includes gating circuits connected to each of said taps, means for opening said gating circuits sequentially and producing a video pulse having a timing corresponding to the voltage distribution on said taps, and an indicator connected to said gating circuits for displaying said video pulse.

15. Apparatus for determining the distance between a radio transmitting system and a radio receiving system, said receiving system including five receiving stations, one of said stations being situated at the center of a circle and the remaining four being equally spaced around the periphery of said circle whereby the signals are received with different time delays, means for determining a linear combination of said time delays, means responsive to said last means for indicating said distance, and means responsive to the measured linear combination of said delay times for producing a video pulse having a time delay corresponding to said distance.

16. The apparatus according to claim 15, wherein said means for determining the linear combination of delay times is arranged to compute the average of the four arrival times of the signals at the four peripheral stations relative to the arrival time at the center station.

* * * * *